United States Patent
Hisada et al.

(10) Patent No.: US 8,001,559 B2
(45) Date of Patent: Aug. 16, 2011

(54) OPTICAL INFORMATION RECORDING MEDIUM AND METHOD FOR MANUFACTURING OPTICAL INFORMATION RECORDING MEDIUM

(75) Inventors: Kazuya Hisada, Osaka (JP); Tsutomu Fujii, Osaka (JP); Morio Tomiyama, Nara (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 12/091,259

(22) PCT Filed: Oct. 23, 2006

(86) PCT No.: PCT/JP2006/321034
§ 371 (c)(1),
(2), (4) Date: Apr. 23, 2008

(87) PCT Pub. No.: WO2007/049544
PCT Pub. Date: May 3, 2007

(65) Prior Publication Data
US 2009/0046567 A1    Feb. 19, 2009

(30) Foreign Application Priority Data

Oct. 24, 2005    (JP) ................... 2005-308163

(51) Int. Cl.
G11B 7/24    (2006.01)
G11B 3/70    (2006.01)

(52) U.S. Cl. ....................... 720/718; 369/283
(58) Field of Classification Search ............ 369/283; 720/718
See application file for complete search history.

(56) References Cited

U.S. PATENT DOCUMENTS

| | | | |
|---|---|---|---|
| 5,989,669 A | 11/1999 | Usami | |
| 6,238,764 B1 | 5/2001 | Usami | |
| 2001/0041242 A1 | 11/2001 | Hayashida et al. | |
| 2003/0211276 A1 | 11/2003 | Hayashida et al. | |
| 2003/0223350 A1* | 12/2003 | Takazawa | 369/286 |
| 2006/0133256 A1 | 6/2006 | Kinoshita et al. | |

FOREIGN PATENT DOCUMENTS

| | | |
|---|---|---|
| JP | 7-85500 | 3/1995 |
| JP | 8-249802 | 9/1996 |
| JP | 10-116448 | 5/1998 |
| JP | 10-134420 | 5/1998 |
| JP | 2001-54922 | 2/2001 |
| JP | 2002-190136 | 7/2002 |
| JP | 2002-230837 | 8/2002 |
| WO | 2004/068484 | 8/2004 |

OTHER PUBLICATIONS

International Preliminary Report on Patentability issued May 8, 2008 in the International (PCT) Application No. PCT/JP2006/321034.

* cited by examiner

*Primary Examiner* — David D Davis
(74) *Attorney, Agent, or Firm* — Wenderoth, Lind & Ponack L.L.P.

(57) ABSTRACT

An optical information recording medium includes a disc-shaped substrate, at least one information recording layer formed over a recording/reproducing-side main surface of the substrate, a light transmitting layer formed over the information recording layer, and a protecting layer formed to cover the light transmitting layer and at least one part of a side end surface perpendicular to the main surface of the substrate. At least the part of the side end surface is covered with the protecting layer for covering the recording/reproducing-side main surface, and the surface of the protecting layer covering at least the part of the side end surface has a larger surface roughness than that of the surface of the protecting layer covering the upper of the recording/reproducing-side main surface.

10 Claims, 3 Drawing Sheets

OPTICAL INFORMATION RECORDING MEDIUM AND METHOD FOR MANUFACTURING OPTICAL INFORMATION RECORDING MEDIUM

BACKGROUND

1. Field of the Invention

The present application is an application claiming a priority on the basis of a Japanese Patent Application No. 2005-308163 filed to Japan on Oct. 24, 2005, and the content in this Japanese Patent Application is incorporated by reference herein, so as to constitute a part of the specification of the present application.

The present invention relates to an optical information recording medium, and a method for manufacturing an optical information recording medium. The invention relates in particular to, for example, an optical information recording medium wherein a recording/reproducing-side main surface thereof is covered with a protecting layer having a low frictional coefficient, and a method for manufacturing the optical information recording medium.

2. Description of the Related Art

In recent years, in the field of information recording, various research on optical information recording has been advanced. This optical information recording makes it possible to attain high-density record and perform non-contact record/reproduction. Thus, the application of the recording to a wide scope is being realized as a manner capable of realizing the record/reproduction at low costs. Examples of existing optical discs include compact discs (CDs) having a capacity of about 700 MB, which has a structure wherein an information layer is deposited on a transparent resin substrate of 1.2 mm thickness and the resultant is protected with an overcoat, and digital versatile discs (DVDs) having a capacity of about 4.7 and a structure wherein one or more information layers is/are deposited on one or two surfaces of each of two transparent resin substrates each having a thickness of 0.6 mm and the two are caused to adhere onto each other.

In recent years, as a method for raising the recording density of optical discs, the following methods have been investigated: a method of making the numerical aperture (NA) of an objective lens large; and a method of making the wavelength of a laser to be used as short as 400 nm. Optical discs called Blu-ray Discs or HD DVDs have been suggested.

In such optical discs, a protecting layer which is not easily damaged has come to be deposited over the recording/reproducing side surface thereof in accordance with a request that the reliability of recorded information should be certainly kept, a request that a handle-ability such that the discs can each be used without being put into a cartridge, and other requests. As the recording density of optical discs becomes higher, required performances of the protecting layer also become higher. Thus, a coating agent which has a larger hardness and a smaller frictional coefficient is being developed, as described in Japanese Patent Laid-open Publications No. 2002-190136 and No. 2002-230837.

BRIEF SUMMARY OF THE INVENTION

One step for manufacturing an optical disc is a step of painting a coating agent over the recording/reproducing-side surface of the optical disc and drying the agent to give a surface having a frictional coefficient. In this case, it is supposed that when the coating agent is formed, the coating agent is formed or adheres to not only the recording/reproducing-side surface but also the side end surface of the optical disc. If the coating agent is formed onto the side end surface of the optical disc, the surface roughness of the side end surface lowers so that the frictional coefficient falls. If the frictional coefficient of the side end surface of the optical disc lowers in this way, there arises a problem that when the optical disc is taken out from a housing case or the optical disc is put into or taken out from a recording/reproducing device, the side end surface slides easily so that the optical disc is very difficult to handle. If the optical disc is dropped on account of this matter, the recording/reproducing-side surface may be injured.

It is common that a user touches the recording/reproducing-side surface with his/her hand since the side end surface of the optical disc is not easily taken by hand; thus, his/her fingerprint and other stains adhere onto the recording/reproducing surface so that a bad effect is produced onto record/reproduction.

An object of the present invention is to provide an optical information recording medium the side end surface of which is easily taken by hand even if a protecting layer having a low frictional coefficient is formed over a recording/reproducing-side main surface of the medium and the low-frictional-coefficient protecting layer unfavorably covers a part of the side end surface thereof, whereby the medium is easily handled by users.

In order to solve the above-mentioned problems, the optical information recording medium of the present invention comprises:

a disc-shaped substrate;

at least one information recording layer formed over a recording/reproducing-side main surface of the substrate;

a light transmitting layer formed over the information recording layer; and a protecting layer formed to cover the light transmitting layer and at least one part of a side end surface perpendicular to the main surface of the substrate;

wherein at least the part of the side end surface is covered with the protecting layer for covering the recording/reproducing-side main surface, and the surface of the protecting layer covering at least the part of the side end surface has a larger surface roughness than that of the surface of the protecting layer covering the recording/reproducing-side main surface.

It is preferred that at least the part of the side end surface has a larger surface roughness than that of the surface over the recording/reproducing-side main surface by 1,000 times or more.

It is also preferred that at least the part of the side end surface is subjected to roughening treatment for making the surface roughness thereof large.

At least the part of the side end surface may have a larger static friction coefficient than that of the surface over the recording/reproducing-side main surface.

The static friction coefficient of at least the part of the side end surface is specified by the following at a time when the disc-formed substrate starts to move from a state that the substrate stands still by holding the substrate so as to sandwich the substrate at a load of about 5.0 N at two points opposite to each other, across the center, in the side end surface of the substrate and simultaneously applying tensile force to the center of the substrate from a direction perpendicular to the diameter between the two points when the substrate is held: the value of the tensile force at this time.

The static friction coefficient of at least the part of the side end surface may be 5.0 N or more. The static friction coefficient of at least the part of the side end surface may be 5.5N or more.

The method according to the present invention for manufacturing an optical information recording medium comprises:

preparing a disc-shaped substrate;

depositing at least one information recording layer over a recording/reproducing-side main surface of the substrate;

forming a light transmitting layer over the information recording layer;

forming a protecting layer to cover the light transmitting layer; and subjecting a side end surface perpendicular to the main surface of the substrate to roughening treatment.

The roughening treatment may be a treatment of rubbing at least one part of the side end surface perpendicular to the main surface of the substrate with sandpaper.

The roughening treatment may be a treatment of treating at least one part of the side end surface perpendicular to the main surface of the substrate with a solvent in which the protecting layer covering at least the part of the side end surface can be dissolved.

According to the optical information recording medium of the invention and the method thereof for manufacturing an optical information recording medium, the surface roughness of the side end surface of the optical information recording medium is made larger than that of the recording/reproducing-side main surface of the optical information recording medium even if a protecting layer having a low frictional coefficient is formed over the recording/reproducing-side main surface of the medium and the low-frictional-coefficient protecting layer covers the side end surface also. Accordingly, the provided optical information recording medium can be an optical information recording medium the side end surface of which is easily taken by hand, whereby the medium is easily handled by users.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE INVENTION

Figure 1:
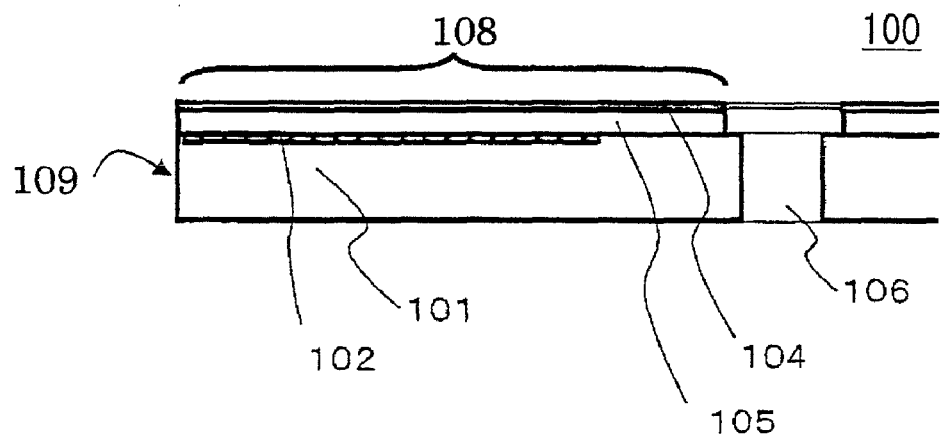
FIG. 1 is a schematic sectional view illustrating an example of an optical information recording medium in an embodiment 1 of the invention.

With reference to the appended figures, optical information recording media according to embodiments of the invention and a manufacturing method thereof will be described hereinafter. The figures are each a sectional view unless otherwise specified. When members to be illustrated in each of the figures are symmetrical with respect to a central axis therein, a cross section of one of both sides by the symmetric axis may be illustrated and the other side may be omitted. In the figures, the same reference numeral is attached to substantially the same members.

First Embodiment

FIG. 1 is a schematic sectional view illustrating the structure of an optical information recording medium according to a first embodiment. This optical information recording medium has, on a disc-shaped substrate 101, at least one information recording layer 102, a light transmitting layer 105, and a protecting layer 104 that are successively formed. This optical information recording medium 100 is characterized in that the frictional coefficient of a side end surface 109 thereof is larger than that of a recording/reproducing-side main surface 108 thereof. This optical information recording medium is the so-called Blu-ray Disc. This Blu-ray Disc is a high-density optical information recording medium which has a recording capacity of 23 GB or more and can attain record and reproduction by use of an optical system having a wavelength of 405 nm and a NA of 0.85.

Figure 2:
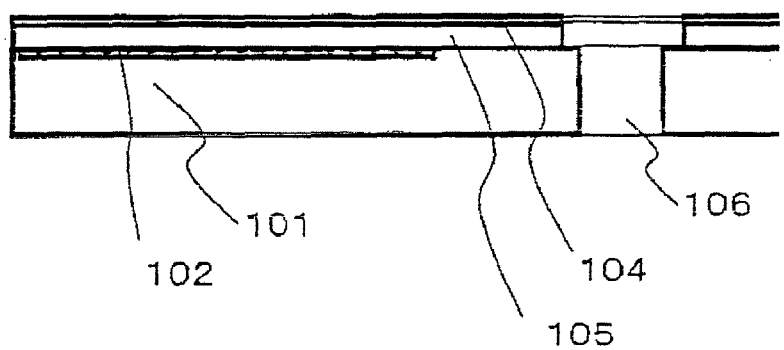
FIG. 2 is a schematic sectional view illustrating an ideal case in which a protecting layer is formed only at the recording/reproducing side.
Figure 3:
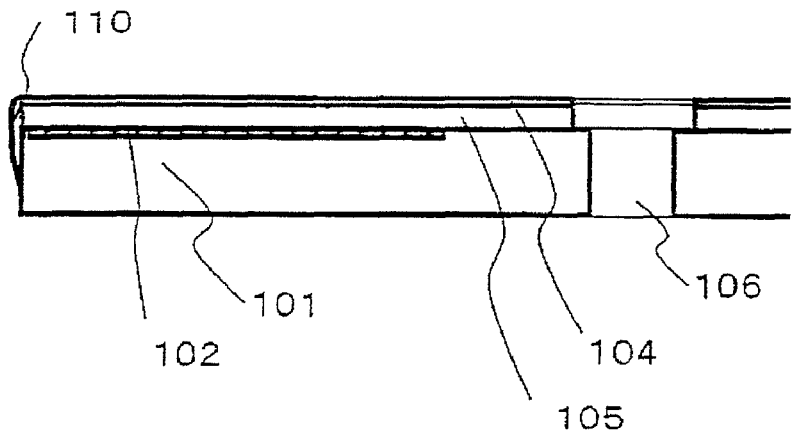
FIG. 3 is a schematic sectional view illustrating an actual case in which a protecting layer is formed also on at least one part of the side end surface.

FIG. 2 is a schematic sectional view illustrating an ideal structure of the optical information recording medium, in which the protecting layer is formed only over the recording/reproducing-side main surface 108. FIG. 3 is a schematic sectional view illustrating a case in which the protecting layer formed over the recording/reproducing-side main surface 108 is formed also on a part of the side end surface 109. As illustrated in FIG. 2, in this optical information recording medium, the protecting layer 104 is ideally formed only over the recording/reproducing-side main surface 108. However, as illustrated in FIG. 3, a protecting layer 110 may be actually formed also on the side end surface 109, which is perpendicular to the recording/reproducing-side main surface 108. This protecting layer 110 is smooth and is small in surface roughness. Accordingly, the static friction coefficient is also low. For this reason, the side end surface slides easily, so that the surface is not easily taken by hand. Thus, there are caused inconveniences that a user touches the recording/reproducing-side main surface or grasps the main surface, so that his/her fingerprint may adhere to the recording/reproducing-side main surface or the user may injure the main surface. As a result, a bad effect may be produced onto record/reproduction. Thus, in the optical information recording medium according to this embodiment 1, about the side end surface, in particular, at least one part of the side end surface 109 onto which the protecting layer 110 adheres, the surface roughness thereof is made larger than that of the recording/reproducing-side main surface 108. It is therefore possible to provide an optical information recording medium the side end surface of which is easily taken by hand, whereby the medium is easily handled by users.

The following will describe each of the constituting members of the optical information recording medium.

First, the substrate 101 is made of an injection-molded polycarbonate, but a resin material other than any polycarbonate, such as acrylic resin or olefin, may be used.

The information recording layer 102 is made of: a guide groove made in the substrate 101 and having a depth of about 20 nm, and a recording film formed thereon and made of a phase variable material or a dielectric material; unevenness pits and/or a guide groove made in the substrate 101, and a reflecting film formed thereon; or the like.

The light transmitting layer 105 is a sheet film, or a layer obtained by hardening a liquid resin. This light transmitting layer is formed by, for example, a method of causing a sheet film to adhere thereto with an adhesive, or a method of coating a liquid resin and hardening the resin. In the method of causing a thin sheet film to adhere thereto with an adhesive, the adhesive may be a radial ray curable resin, a thermosetting resin, or a pressure-sensitive adhesive (sticking agent). The liquid resin may be a radial ray curable resin or a thermosetting resin as the liquid resin. As the method for coating this liquid resin, for example, a spin coating method can be used. The radial ray curing resin may be, for example, an acrylic material. A material other than the acrylic material may be used.

Furthermore, the protecting layer 104 is a sheet film or a layer obtained by hardening a liquid resin in the same manner as the light transmitting layer. This light transmitting layer is formed by, for example, a method of causing a sheet film to adhere thereto with an adhesive, or a method of coating a liquid resin and hardening the resin. In the method of causing a thin sheet film to adhere thereto with an adhesive, the adhesive may be a radial ray curable resin, a thermosetting resin, or a pressure-sensitive adhesive (sticking agent). The liquid resin may be a radial ray curable resin or a thermosetting resin as the liquid resin. As the method for coating this liquid resin, for example, a spin coating method can be used. The radial ray curing resin may be, for example, an acrylic material. A material other than the acrylic material may be used.

This protecting layer 104 is formed to set the hardness of the surface to a pencil hardness of H or more and further make the value of the static friction coefficient small. Specifically, this optical information recording medium is more easily affected by an injure in the recording/reproducing-side main surface, or dust, a fingerprint or the like on the surface than CDs or DVDs since the recording medium is a medium for making record/reproduction at a short wavelength as described above. Since the protecting layer 104 has such a hardness that the pencil hardness is H or more and further the value of the static friction coefficient is made small, it is possible to prevent an injure from being generated in the surface with ease or prevent dust or a fingerprint from adhering to the surface with ease.

The pencil hardness referred to herein can be measured in accordance with the Japanese Industrial Standard JIS-K5400 (notes: it was abolished on Apr. 20, 2002, and was shifted to JIS-K5600-1-1 to K5600-8-6, and "Scratch Hardness (Pencil Method)" is described in JIS-K5600-5-4: the corresponding International Standards Organization ISO/DISPLAY 15184: 1996). The measuring method is specifically as follows: only a woody portion of the tip of each of pencils having individual predetermined hardness is shaven off with leaving a cylindrical core thereof as it is; each of the resultants is pushed onto the surface of an object to be measured at a load of 750 g and an angle of 45°; the pencil is pulled out while the load is applied thereto; and it is decided whether or not an injure is generated. In this measurement, the hardness is gradually made higher from a soft hardness, out of the pencils having the individual predetermined hardness, until an indentation (injure) is generated; and the hardness at which the indentation (injure) is generated in the surface is decided as the pencil hardness of the surface (on the basis of JIS-K5600-5-4).

When the value of the static friction coefficient is made small, an advantageous effect can be obtained that the surface of the protecting layer 104 is not easily injured in the case that the protecting layer 104 and another object contact each other. As the method for this injuring test, for example, a Taber test (according to the standard ISO 9352) can be used.

If the protecting layer 110 is unfavorably formed also on the side end surface 109 perpendicular to the recording/reproducing-side main surface 108 of the optical information recording medium 100 as illustrated in FIG. 3 when at the time of the formation of the protecting layer 104, the frictional coefficient becomes too low so that a user does not take the medium easily by hand. As a result, the following matter is apt to be frequently caused: the user drops the medium or the user grasps the recording/reproducing-side main surface by hand. Conversely, this matter results in a risk that the recording/reproducing-side main surface 108 is injured or gets dirty.

Thus, in the optical information recording medium 100 according to the embodiment 1, at least one part of the side end surface 109 perpendicular to the recording/reproducing-side main surface 108 is made larger in surface roughness than the surface over the recording/reproducing-side main surface 108. Specifically, at least the part of the side end surface is made larger in surface roughness than the surface over the recording/reproducing-side main surface by about 1000 times or more. This can be realized by subjecting at least the part of the side end surface to roughening treatment. The roughening treatment is according to, for example, treatment of at least the part of the side end surface with a sandpaper, or a method of treating at least the part of the side end surface with a solvent in which the protecting layer covering at least the part of the side end surface can be dissolved.

As described above, at least one part of the side end surface is covered with the protecting layer for covering the recording/reproducing-side main surface, and the roughening treatment is preferably applied to the protecting layer covering at least the part of the side end surface. However, the present invention is not limited to this manner. Thus, it is sufficient that roughening treatment is applied to one part of the side end surface whether or not the protecting layer is present, whereby the surface roughness thereof can be made larger than that of the recording/reproducing-side main surface.

The surface roughness of the side end surface of the substrate can be measured with an ordinary surface roughness measuring meter. The surface roughness can be measured by use of, for example, a microscopic surface shape measuring meter (level difference meter) ET-30 manufactured by Kosaka Laboratory Co., Ltd. In this optical information recording medium 100, surface roughness described below were able to be measured about only the substrate, the recording/reproducing-side main surface of the optical information recording medium, and at least one part of the side end surface (in the case that the part was subjected to sandpaper treatment).

a) Only the substrate:
Average surface roughness (Ra): 0.5 nm
Maximum surface roughness (Rmax): 2 nm
b) Recording/reproducing-side main surface of the optical information recording medium (after its light transmitting layer and its hologram recording material layer were formed):
Average surface roughness (Ra): 0.2 nm
Maximum surface roughness (Rmax): 1 nm
c) At least one part of the side end surface of the optical information recording medium (treated with a sandpaper (JIS #1000)):
Average surface roughness (Ra): 15 μm
Maximum surface roughness (Rmax): 74 μm As described above, at least the part of the side end surface of the optical information recording medium (in the case that the part was subjected to sandpaper treatment) was larger in average surface roughness (Ra) than the recording/reproducing-side main surface by 75,000 times, and was larger in maximum surface roughness (Rmax) than the recording/reproducing-side main surface by 74,000 times. When the surface roughness of at least one part of the side end surface of the optical information recording medium is made larger in such a way than that of the recording/reproducing-side main surface, for example, by 1,000 times or more, a user comes to be able to take, with ease, the side end surface of the optical information recording medium by hand. Thus, the handling of the optical information recording medium becomes easy.

About this optical information recording medium, at least the part of the side end surface 109 perpendicular to the recording/reproducing-side main surface 108 is larger in surface roughness than the surface over the recording/reproducing-side main surface 108; accordingly, the static friction coefficient of at least the part of the side end surface is larger than that of the recording/reproducing-side main surface. The static friction coefficient of the side end surface cannot be measured by any ordinary method since the side end surface is in a curved surface form. Thus, in the present specification, the static friction coefficient of the side end surface is calculated out by a static friction coefficient measuring method as described below.

The method for measuring the static friction coefficient of the side end surface in the present application will be described hereinafter, using FIGS. 4A to 4C.

Figure 4A:
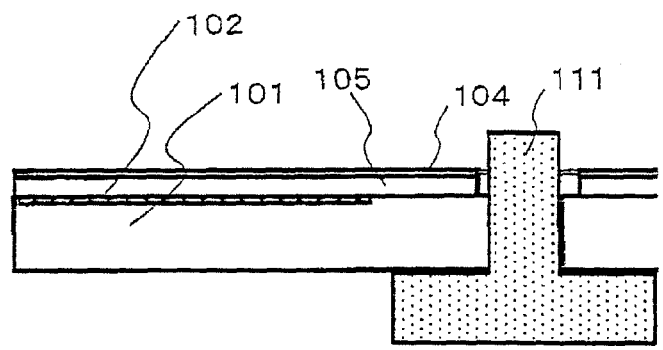
FIG. 4A is a sectional view illustrating an example of members for a method for measuring the frictional coefficient of an end surface.

(a) As illustrated in FIG. 4A, a disc 118 to be measured is put onto a member 111 having a convex portion, 15 mm in diameter, which is to be inserted into a center hole in the disc 118, and a portion, 33 mm in diameter, on which the disc 118 is to be put. This member is made of SUS 304, and is finished into a surface roughness (Ra) of 1.6 µm.

Figure 4B:
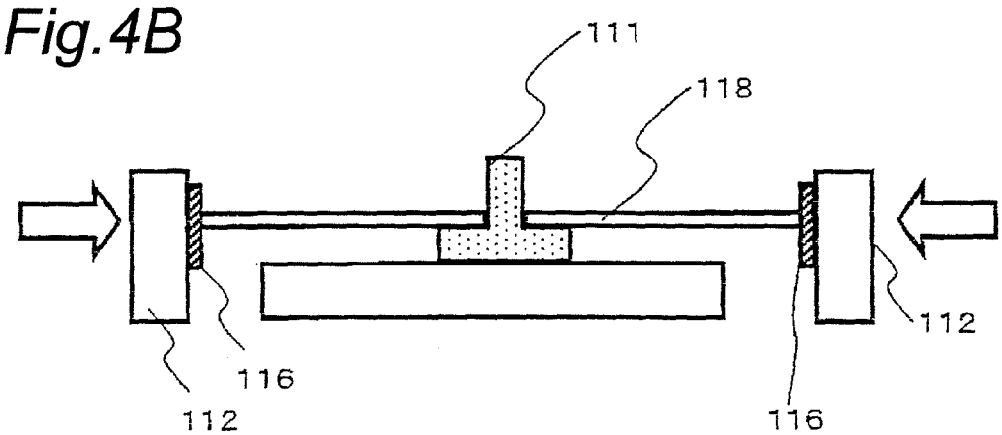
FIG. 4B is a sectional view illustrating the method for measuring the frictional coefficient of the end surface.
Figure 4C:
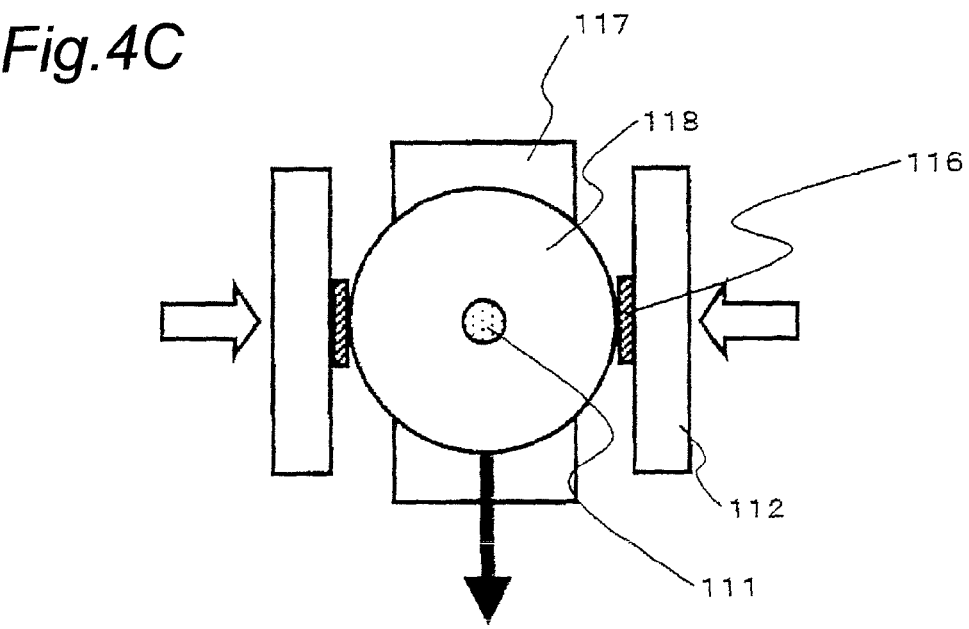
FIG. 4C is a plan view illustrating the method for measuring the frictional coefficient of the end surface.
Figure 5:
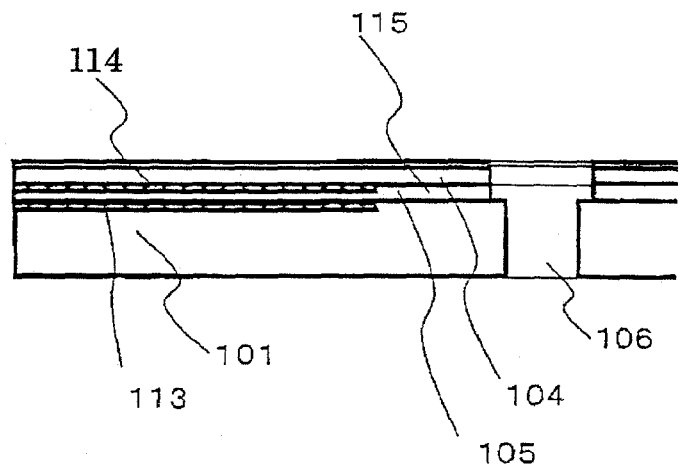
FIG. 5 is a sectional view illustrating a multi-layered optical information recording medium in the invention.

(b) As illustrated in FIG. 4B (a sectional view) and FIG. 4C (a top view), the member for supporting the disc 118 is pulled out (a black arrow in FIG. 4C) while the disc 118 is sandwiched under a load of 5.0 N applied from both sides thereof (white arrows in FIG. 4B). At this time, a silicone rubber 116 having a hardness of 50 and a thickness of 1.0 mm is caused to adhere onto a portion where a member 112 for sandwiching the disc 118 and the disc 118 contact each other. Furthermore, the member 111 on which the disc 118 is put is pulled out on a plate that is made of SUS 304, which is the same material, and that has a surface roughness (Ra) of 1.6 µm.

(c) The member for supporting the disc 118 is pulled out. The tensile force when the disc 118 starts to move from a state that the disc 118 stands still is measured. The value of the tensile force is defined as the static friction coefficient of the side end surface. The same measurement is made 5 times. The average value of three out of the measurements, wherein the maximum measurement result and the minimum measurement result are excluded, is defined as the measurement value of the static friction coefficient. This method is defined as the end surface frictional coefficient measuring method.

By the end surface frictional coefficient measuring method, the static friction coefficient of the side end surface of the substrate 101 made of polycarbonate was measured immediately after the shape thereof was obtained. As a result, it was 7.2 N. The static friction coefficient of the disc used in the present embodiment, wherein the protecting layer was caused to adhere onto the side end surface, was 4.5 N.

Next, an examination was made about the relationship between the frictional coefficient of the side end surface of optical discs and the degree of being easy to take by hand about the discs. The examination was made by ten examinees selected at random. The "degree of being easy to take by hand" referred to herein was examined, on the assumption that any one of the optical discs was taken out from a slot-in player, as follows: The examinees were each asked to have only the side end surface of any one of the discs with two fingers of his/her one hand, i.e., his/her thumb and middle finer without touching the recording/reproducing-side main surface of the disc with any finger. In the above-mentioned two cases, the number of the examinees who gave an answer that their fingers slid on the side end surface of the disc and the disc was not easy to take by hand was examined. The results are shown in Table 1 described below. In the case of any disc wherein the result of the end surface frictional coefficient was 5.0 N or less out of the discs, eighty percentages or more of the examinees gave an answer that the disc was not easy to take by hand. Accordingly, it is preferred that the value of the frictional coefficient is more than 5.0 N. It is more preferred that the value is 5.5 N or more. About this case, seventy percentages or more of the examinees give an answer that the disc is easy to take by hand.

TABLE 1

| End surface frictional coefficient (N) | 4.5 | 5.0 | 5.2 | 5.5 | 6.0 | 7.2 |
|---|---|---|---|---|---|---|
| Number of examinees which gave answer that disc was not easy to take by hand | 10 | 8 | 7 | 2 | 1 | 0 |

In the case of making the surface roughness of the side end surface of an optical information recording medium in such a way to make the static friction coefficient of the side end surface high, any user can handle the optical information recording medium very easily. Thus, an injure, dust or a fingerprint is not generated in or attached to the recording/reproducing-side main surface of the optical information recording medium, so that the reliability is easily kept at a high level.

This optical information recording medium is a Blu-ray Disc, as described above. According to this optical information recording medium, record and reproduction are made in its information recording layer by use of an optical system giving a wavelength of 405 nm and having a numerical aperture (NA) of 0.85. The substrate of the optical information recording medium has a diameter of 120 mm, and a center hole in the substrate has a diameter of 15 mm. The thickness of the substrate is about 1.1 mm, and the total thickness of the light transmitting layer and the protecting layer over the recording/reproducing-side main surface is about 0.1 mm. Furthermore, in this optical information recording medium, a cyclic projection may be formed around the center hole, the height of the projection being from 0.05 to 0.5 mm, preferably from 0.1 to 0.3 mm, more preferably from 0.10 to 0.20 mm. This cyclic projection may be arranged inside an area having a diameter of 17.5 to 22 mm.

The example of the optical information recording medium which has been described herein is the recording/reproducing type, rewritable optical disc. However, the optical information recording medium may be a write-once read-many optical disc, wherein record can be made only once, or a read-only optical disc, wherein a reflecting layer is made mainly of Al or Ag. Furthermore, as well as a case where only one layer is present over an information recording layer, as described as the example of the present embodiment, the following case or disc is allowable: a case where plural layers are present over an information recording layer; or a multi-layered optical disc, which has two or more layers as its information recording layers.

The following will describe a method for manufacturing this optical information recording medium, using FIG. 1.

(a) As illustrated in FIG. 1, the substrate 101 is prepared which has a thickness of about 1.1 mm, a diameter of about 120 mm and a center hole diameter of about 15 mm.

(b) The information recording layer 102 is formed on a recording/reproducing-side main surface of the substrate 101.

(c) A radial ray curable resin A is formed onto the information recording layer 102 by spin coating.

(d) A radial ray is radiated thereto so as to cure the radial ray curable resin A, thereby forming the light transmitting layer 105 having a thickness of about 97 μm.

(e) Furthermore, a radial ray curable resin B is formed onto the light transmitting layer 105 by spin coating. In this case, the resin B is rotated away as speedily as possible in the spin coating, whereby the radial ray curable resin B does not adhere onto at least one part of the side end surface so that its high static friction coefficient can be kept as it is. In the case that the radial ray curable resin B adheres onto the side end surface, it is preferred to wipe off the resin before a radial ray is radiated thereto.

For convenience' sake, the radial ray curable resins A and B are represented by the different symbols; however, they may be the same.

(f) A radial ray is radiated to cure the radial ray curable resin B, thereby forming the protecting layer 104 having a thickness of about 3 μm. In this way, the total thickness of the light transmitting layer 105 and the protecting layer 104 can be set to 0.1 mm.

The "radial ray" referred to herein is a concept including all electromagnetic waves making it possible to cure a radial ray curable resin, examples of which include infrared rays, visible rays, ultraviolet rays, and X-rays.

As described above, the optical information recording medium 100 in the embodiment of the present invention can be manufactured.

Second Embodiment

Herein, about the method of the present invention for manufacturing an optical information recording medium and the optical information recording medium, an example thereof is described. About the same parts or portions described in the first embodiment, overlapping description may be omitted.

About an optical information recording medium according to the second embodiment, a case where a protecting layer 104 is formed on a part of the side end surface of a substrate or the whole thereof is supposed in the same way as in the first embodiment. At this time, it is preferred to roughen the part or the whole of the side end surface with a chemical or sandpaper, thereby making the static friction coefficient of the side end surface high, that is, roughening the side end surface. The chemical used in this case is not particularly limited as long as the chemical is a chemical wherein the surface of the protecting layer 104 adhering to the side end surface can be dissolved. For example, a volatile organic solvent is preferred, examples of which include acetone, methyl ethyl ketone, benzene, tetra-hydrofuran, hexane, and a mixed solvent of the above-mentioned individual solvents such as a thinner.

In this optical information recording medium, surface roughness as described below were able to be measured about a case a) in which at least one part of the side end surface of the optical information recording medium was subjected to treatment with acetone, and a case b) in which at least one part was subjected to treatment with HP THINNER (trade name, component: 2-heptanone, Tokyo Ohka Kogyo Co., Ltd.).

a) At least the part of the side end surface of the optical information recording medium (treated with acetone):
Average surface roughness (Ra): 10 μm, Maximum surface roughness (Rmax): 40 μm b) At least the part of the side end surface of the optical information recording medium (treated with HP THINNER):
Average surface roughness (Ra): 20 μm, Maximum surface roughness (Rmax): 88 μm As described above, at least the part of the side end surface of the optical information recording medium was larger in average surface roughness (Ra) than the recording/reproducing-side main surface by 50,000 times and was larger in maximum surface roughness (Rmax) than the recording/reproducing-side main surface by 40,000 times in the case a) in which the part was treated with acetone. Moreover, in the case b) in which at least the part of the side end surface of the optical information recording medium was treated with HP THINNER, the part of the side end surface of the optical information recording medium was larger in average surface roughness (Ra) than the recording/reproducing-side main surface by 100,000 times, and was larger in maximum surface roughness (Rmax) than the recording/reproducing-side main surface by 88,000 times. When the surface roughness of at least one part of the side end surface of the optical information recording medium is made larger in such a way than that of the recording/reproducing-side main surface, a user comes to be able to take, with ease, the side end surface of the optical information recording medium by hand. Thus, the handling of the optical information recording medium becomes easy.

When the static friction coefficient of the side end surface of the substrate is made high or the surface is made rough as described above, any user can handle the optical information recording medium very easily. Moreover, an injure, dust or a fingerprint is not generated in or attached to the recording/reproducing-side main surface of the optical information recording medium, so that the reliability is easily kept at a high level.

In the case that the layer through which recording/reproducing light is transmitted is made of only one layer, such as a case in which the light transmitting layer 105 has the performance of the protecting layer 104 together, it is also preferred to roughen the side end surface, thereby making the static friction coefficient large to cause the disc to be easily handled.

The example which has been described herein is the recording/reproducing type, rewritable optical disc. However, the optical information recording medium may be a write-once read-many optical disc, wherein record can be made only once, or a read-only optical disc, wherein a reflecting layer is made mainly of Al or Ag. Furthermore, the following case or disc is allowable: a case where plural layers are present over an information recording layer, as described in the present embodiment; or a multi-layered optical disc, which has two or more layers as its information recording layers.

Third Embodiment

An optical information recording medium according to a third embodiment of the invention is described. About the same parts or portions described in the first and second embodiments, overlapping description may be omitted. The examples which have been described in the first and second embodiments are examples wherein the static friction coefficient of a part of the whole of the side end surface is made higher than that of the recording/reproducing-side main surface on the assumption that the protecting layer 104 is formed.

However, it has been found out that: in the case that the protecting layer 104 is not formed, either, at the time when a user inserts such an optical information recording medium into a slot-in type drive (for example, a car navigation system CN-DV255FD or a car audio CQ-DFX983D, manufactured by Panasonic) the user feels inconvenience very much in the insertion of the optical information recording medium or in taking out the medium; thus, the user unfavorably grasps the recording/reproducing-side main surface very frequently.

Thus, according to this embodiment 3, it is possible to provide an optical information recording medium wherein the static friction coefficient of its side end surface is made high, whereby any user can easily handle this medium, when the protecting layer 104 is not formed, that is, when only a light transmitting layer is formed on an information recording layer without forming any protecting layer and this light transmitting layer functions also as a protecting layer.

Specifically, the side end surface is made rough with sandpaper or a chemical, such a material that makes the static friction coefficient high is formed on the side end surface, irregularities are formed, or some other means is adopted, as described in the embodiments 1 and 2.

Fourth Embodiment

An optical information recording medium according to a fourth embodiment of the invention is described. About the same parts or portions described in the first to third embodiments, overlapping description may be omitted.

Figure 6A:
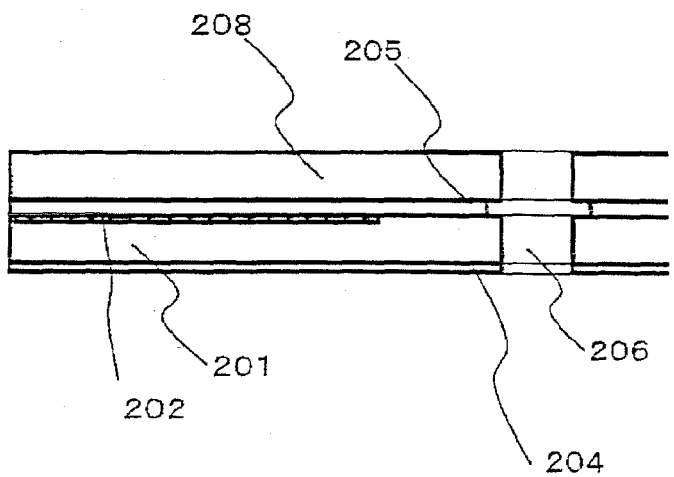
FIG. 6A is a schematic sectional view illustrating an example of an optical information recording medium having a mono-layered information recording layer in an embodiment 4 of the invention.
Figure 6B:
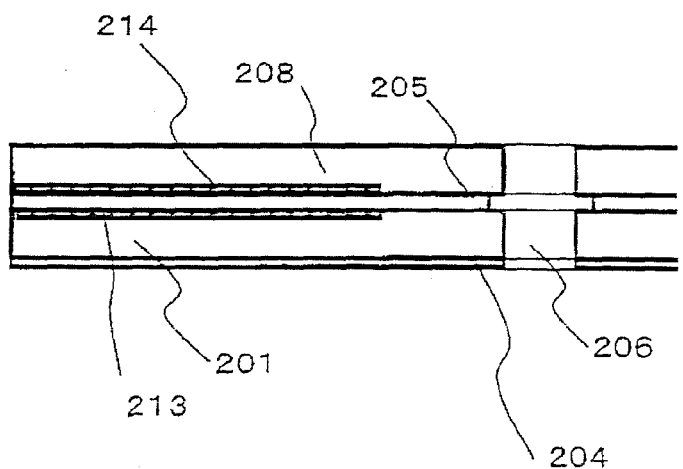
FIG. 6B is a schematic sectional view illustrating an example of an optical information recording medium having a bi-layered information recording layer.

In the above-mentioned embodiments, high-density optical information recording media wherein a light transmitting layer and a protecting layer each have a thickness of about 0.1 mm, i.e., the so-called Blu-ray Discs have been given as the examples. However, the present invention can be applied to optical information recording media wherein record and reproduction are made at a wavelength of 405 nm and a numerical aperture of 0.65 and two substrates each having a thickness of about 0.6 mm are caused to adhere onto each other, i.e., the so-called HD-DVDs, as illustrated in FIGS. 6A and 6B (a mono-layered information recording layer is illustrated in FIG. 6A, and a bi-layered information recording layer is illustrated in FIG. 6B), DVDs, and CDs.

Specifically, by making the static friction coefficient of a part or the whole of the side end surface high, the side end surface comes to be easily grasped so that the medium can be rendered a medium which does not need to grasp the recording/reproducing-side main surface so as to be sufficiently easy to handle. In this way, the reliability of the optical information recording medium is improved to prevent the following: any user fails to record important data or the reproduction becomes impossible. To make the surface roughness of the side end surface large as described above to make the static friction coefficient high is effective for all optical information recording media which are each not put in a cartridge, and all optical information recording media wherein their recording/reproducing surface is desired not to be touched by user's hand as much as possible. Naturally, the invention is effective for not only any case in which an information recording layer is mono-layered but also the so-called multi-layered discs having plural information recording layers.

As described above, the present invention has been described in detail by way of the preferred embodiments. However, the invention is not limited to these embodiments, and it is evident for those skilled in the art that within the technical scope of the invention recited in the claims, many preferred variations and modifications can be attained.

The optical information recording medium according to the invention is an optical information recording medium which is easy to handle and is high in reliability. The medium is useful in particular as a Blu-ray Disc, wherein the total thickness of its light transmitting layer and its protecting layer is as small as 0.1 mm.

The invention claimed is:

1. An optical information recording medium, comprising:
a disc-shaped substrate;
an information recording layer formed over a recording/reproducing-side main surface of the substrate;
a light transmitting layer formed over the information recording layer; and
a protecting layer formed to cover the light transmitting layer and at least one part of a side end surface perpendicular to the main surface of the substrate,
wherein at least the part of the side end surface is covered with the protecting layer for covering the recording/reproducing-side main surface, and the surface of the protecting layer covering at least the part of the side end surface has a larger surface roughness than that of the surface of the protecting layer covering the recording/reproducing-side main surface,
wherein at least the part of the side end surface has a larger static friction coefficient than that of the surface over the recording/reproducing-side main surface, and
wherein the static friction coefficient of at least the part of the side end surface is determined as follows: the recording medium is held on the part of the side end surface at two points opposite to each other across the center of the recording medium so as to sandwich the recording medium at load of about 5.0 N, and simultaneously a tensile force is applied to the center of the recording medium from a direction perpendicular to a line connecting the two points, and the static friction coefficient is the tensile force measured at a time when the substrate starts to move from a state in which the substrate stands still.

2. The optical information recording medium according to claim 1, wherein at least the part of the side end surface has a larger surface roughness than that of the surface over the recording/reproducing-side main surface by 1,000 times or more.

3. The optical information recording medium according to claim 1, wherein at least the part of the side end surface is subjected to roughening treatment for making the surface roughness thereof large.

4. The optical information recording medium according to claim 1, wherein the static friction coefficient of at least the part of the side end surface is 5.0 N or more.

5. The optical information recording medium according to claim 1, wherein the static friction coefficient of at least the part of the side end surface is 5.5N or more.

6. A method for manufacturing an optical information recording medium, the method comprising:
preparing a disc-shaped substrate;
depositing an information recording layer over a recording/reproducing-side main surface of the substrate;
forming a light transmitting layer over the information recording layer;
forming a protecting layer to cover the light transmitting layer; and
subjecting a side end surface perpendicular to the main surface of the substrate to roughening treatment, wherein at least a part of the side end surface has a larger static friction coefficient than that of the surface over the recording/reproducing-side main surface, and wherein the static friction coefficient of at least the part of the side end surface is determined as follows: the recording medium is held on the part of the side end surface at two points opposite to each other across the center of the recording medium so as to sandwich the recording medium at load of about 5.0 N, and simultaneously a tensile force is applied to the center of the recording medium from a direction perpendicular to a line connecting the two points, and the static friction coefficient is the tensile force measured at a time when the substrate starts to move from a state in which the substrate stands still.

7. The method for manufacturing an optical information recording medium according to claim 6, wherein the roughening treatment is a treatment of rubbing at least one part of the side end surface perpendicular to the main surface of the substrate with a sandpaper.

8. The method for manufacturing an optical information recording medium according to claim 6, wherein the roughening treatment is a treatment of treating at least one part of the side end surface perpendicular to the main surface of the substrate with a solvent in which the protecting layer covering at least the part of the side end surface can be dissolved.

9. The method for manufacturing an optical information recording medium according to claim 6, wherein the static friction coefficient of at least the part of the side end surface is 5.0 N or more.

10. The method for manufacturing an optical information recording medium according to claim 6, wherein the static friction coefficient of at least the part of the side end surface is 5.5N or more.

* * * * *